Figure 1:
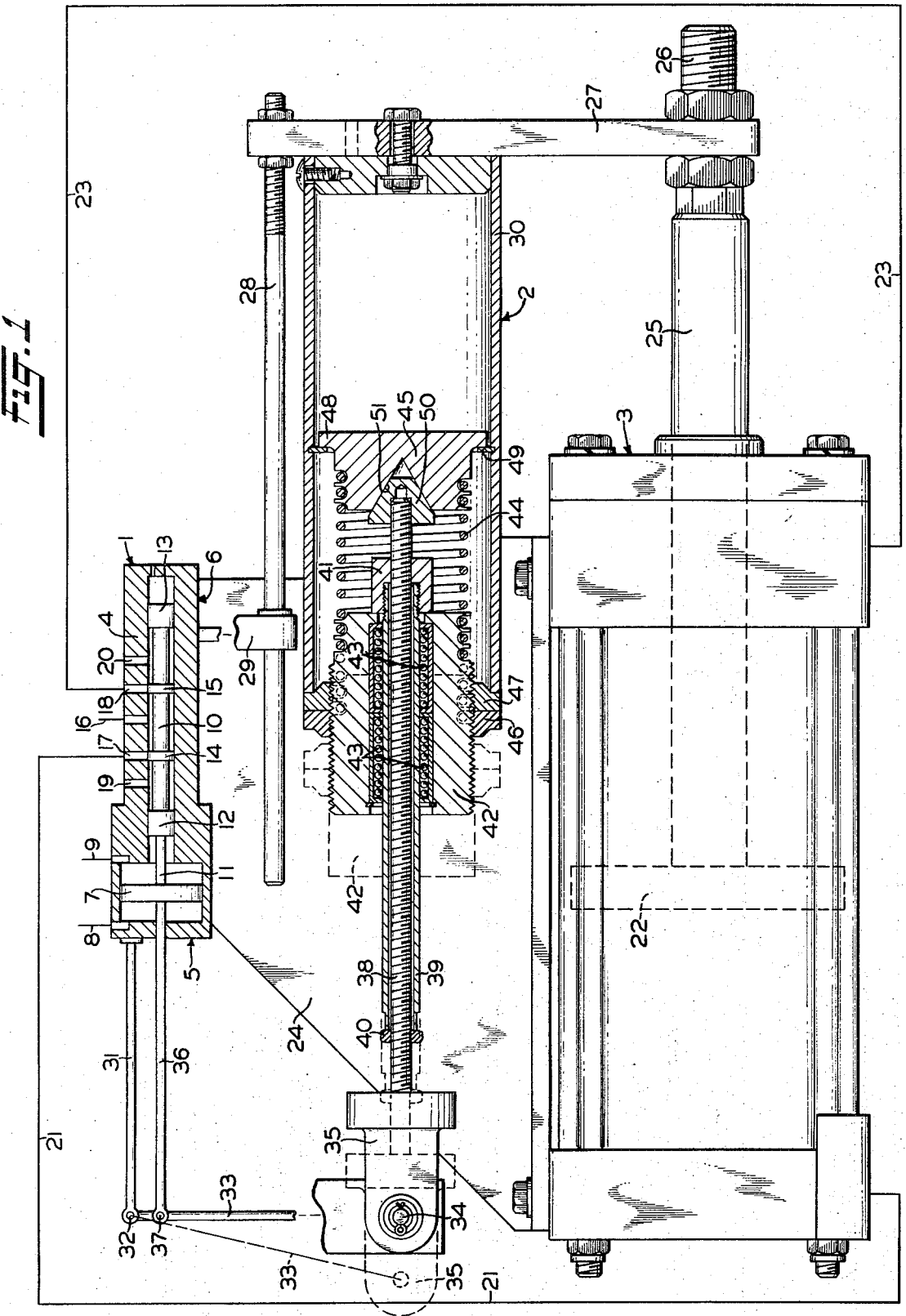

United States Patent [19]
Olson et al.

[11] 3,831,490
[45] Aug. 27, 1974

[54] FLUID PRESSURE OPERABLE SERVO POSITIONER

[75] Inventors: Paul E. Olson; Homer A. Knight, both of Lexington, Ky.

[73] Assignee: Westinghouse Air Brake Company, Wilmerding, Pa.

[22] Filed: Sept. 15, 1972

[21] Appl. No.: 289,754

[52] U.S. Cl. ................................................ 91/387
[51] Int. Cl. ........................................... F15b 13/16
[58] Field of Search ...................................... 91/387

[56] References Cited
UNITED STATES PATENTS

| | | | |
|---|---|---|---|
| 2,126,533 | 8/1938 | Caughey | 91/387 |
| 2,264,262 | 11/1941 | Erbguth | 91/387 |
| 2,832,200 | 4/1958 | Grout et al. | 91/387 |
| 3,290,996 | 12/1966 | Floyd | 91/387 |
| 3,316,815 | 5/1967 | Chapin et al. | 91/387 |
| 3,362,296 | 1/1968 | Gray et al. | 91/387 |
| 3,693,501 | 9/1972 | Ward | 91/387 |

*Primary Examiner*—Paul E. Maslousky
*Attorney, Agent, or Firm*—R. W. McIntire, Jr.

[57] ABSTRACT

A servo positioner for selectively positioning a machine component or device in accordance with a preselected fluid pressure signal input. An operator controlled actuator, when subjected to a preselected control pressure signal, causes a valve portion to transmit operating fluid pressure to a power cylinder for positioning the machine part or device connected thereto at a position determined by the degree of the control pressure signal, and a force-balancing portion for counter-balancing the force exerted by the power cylinder for maintaining the preselected position thereof and for restoring the valve portion to a neutral position.

4 Claims, 2 Drawing Figures

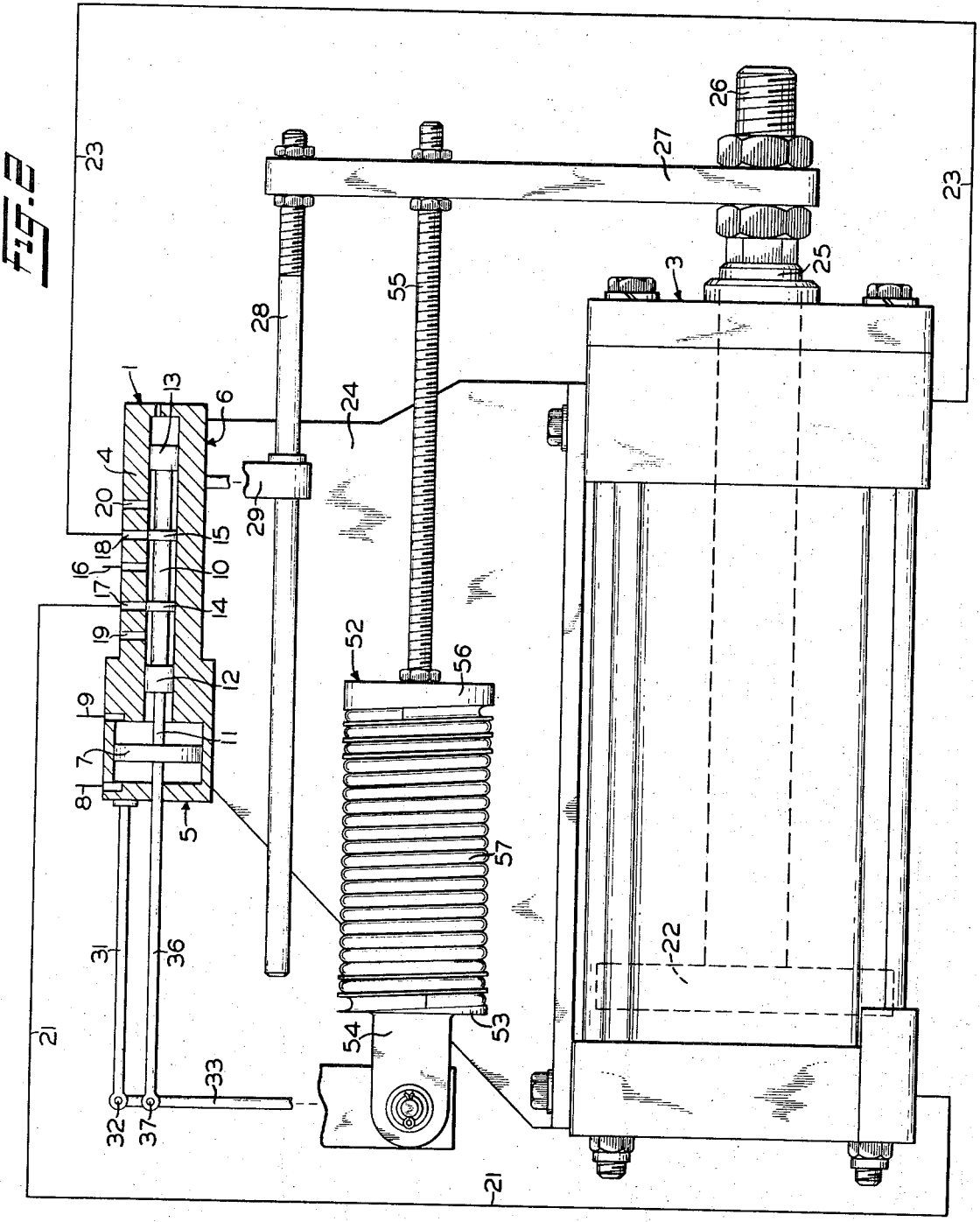

FLUID PRESSURE OPERABLE SERVO POSITIONER

BACKGROUND OF THE INVENTION

Servo positioners are used extensively in numerous applications. In connection with marine equipment, for example, a servo positioner may be used in controlling variable pitch propellers, engine governors, steering mechanism, or steam valves. In general industrial applications, servo positioners may be used for positioning potentiometers, butterfly valves, squeeze rolls, hopper gates, torque converters, or hydrostatic transmissions. With so many applications, as those just mentioned, it is important that the servo positioner be positive in its action, quick to respond to a control impulse, and therefore free of hysteresis.

SUMMARY OF THE INVENTION

The object of the present invention, therefore, is to provide a servo positioner characterized by reliability of operation by possessing the ability to respond to a control impulse without hesitation and to positively move the device or machine part to the precise position desired and to maintain said device or machine part in the desired position without variation unless a change in position is effected by the operator.

The servo positioner embodying the invention comprises a friction free piston actuator responsive to a control pressure impulse at a degree selected by the operator for effecting operation of an operationally sensitive valve device to cause operating fluid pressure to be supplied to a power cylinder device connected to the machine part or device to be positioned. A caged spring device operatively interposed between the valve actuator and the power cylinder device is subjected to and therefore placed under tension by a force acting in one direction, as provided by the control pressure acting on the actuator, and to an opposing force provided by operating pressure supplied to the power cylinder device, until said opposing force balances said one force sufficiently to effect restoration of the valve device to a neutral or cut-off position in which further supply of operating pressure to the power cylinder is cut off and the position thereof established, unless the operator effects a change in the degree of the control impulse. The power cylinder device may be set up so that the zero or neutral position of the piston is at the midpoint of the travel stroke and movable in either direction therefrom, or so that the zero or neutral position of the piston is at one extreme end of the travel stroke and movable away from and back toward the neutral position. A double diaphragm actuator may be used for either set up of the power cylinders by providing a pair of control pressure inlet ports for alternatively pressurizing one of the diaphragms for obtaining the desired direction of movement of the power piston in which the zero position is at midpoint, or by using just one of the ports for pressurizing and depressurizing the appropriate one of the diaphragms for obtaining movement of the piston having the zero or neutral position at one end.

In the drawings, FIG. 1 is an elevational schematic view, in section and in outline, of a servo positioner apparatus embodying the invention; and FIG. 2 is an elevational schematic view, partly in section, of a modified version of the servo positioner shown in FIG. 1.

DESCRIPTION AND OPERATION

As shown in FIG. 1, the servo positioner apparatus generally comprises a control valve device 1, a caged spring or force balancing device 2, and a power cylinder device 3.

The valve device 1 may be of any suitable type which will provide the desired operational results, but preferably is a spool type such as disclosed in a copending application assigned to the assignee of the present application and disclosed in Case No. 6596 of the Westinghouse Air Brake Company, Wilmerding, Pa. Valve device 1 is shown in simplified form and, as shown, comprises a casing 4 in which an actuator portion 5 and a valve portion 6 are coaxially operably disposed. The actuator portion 5 is provided with a double-acting actuator piston 7 alternatively subjectable, at the operator's discretion, to control fluid at a selected pressure on opposite sides thereof via respective control pressure inlet ports 8 and 9, whereby the desired direction of travel of the piston may be effected. The valve portion 6 comprises a spool valve member 10 connected to piston 7 by a valve stem 11, said spool valve, valve stem and piston all being arranged in axial alignment for uniform axial movement together.

Spool valve 10 is provided with guide lands 12 and 13 at each end, respectively, and with two valve lands 14 and 15 axially spaced on said valve member so as to control communications between a fluid pressure supply port 16, delivery ports 17 and 18, and exhaust ports 19 and 20. When piston 7 and spool valve 10 are in a neutral or cut-off position, in which they are shown in the drawing, land 14 is effective for cutting off communication of delivery port 17 with both supply port 16 and exhaust port 19, and land 15 is effective for cutting off communication of delivery port 18 with both supply port 16 and exhaust port 20.

Of course, pressurization of the left side of piston 7, as viewed in the drawing, causes rightward movement of spool valve 10 to a first supply-exhaust position in which land 14 moves to the right of delivery port 17 to continue to isolate supply port 16 from said delivery port which is placed in communication with exhaust port 19, and land 15 moves to the right of delivery port 18 to continue to isolate exhaust port 20 from said delivery port 18 which is placed in communication with supply port 16. It should be evident that depressurization of the left side of piston 7 and pressurization of the right side thereof, as viewed in the drawing, produces leftward movement of spool valve 10 and a reversal of the communications between the several ports consistent with that above described.

The construction of the valve device 1 is preferably of the type providing maximum friction-free movement of both the piston 7 and spool valve 10, as well as instant flow of fluid pressure between the several ports in accordance with the position of said spool valve. The particular details of the construction of the valve device 1 are not essential to an understanding of the invention disclosed herein, but are fully disclosed and explained in the aforementioned copending application. For this reason the valve device 1 is shown in the drawings in simplified form and in a disproportionately smaller scale relative to the caged spring device 2 and the power cylinder 3.

Delivery port 17 is connected via a pipe or conduit 21 to the left side of power cylinder device 3, as viewed in the drawing, whereby the corresponding side of a power piston 22 operably disposed therein may be subjected to fluid pressure for causing rightward movement of said piston from a zero or neutral position in which the piston occupies a position midway between the two ends of the cylinder, as shown in the drawing. Delivery port 18 is connected via a pipe or conduit 23 to the right side of power cylinder device 3 for causing leftward movement of piston 22 when the right side of said piston is pressurized.

A bracket 24 to which both the control valve device 1 and the power cylinder device 3 are secured, serves also for retaining the two devices in proper disposition relative to each other.

A piston rod 25 having one end concentrically secured to one side (the right side in this instance) of the piston 22, extends coaxially through the power cylinder device 3 and outwardly through the right end thereof in sealing and sliding relation therewith. The outer end of rod 25 is provided with a screw-threaded stud portion 26 by which said power cylinder may be connected to a machine part or device, for example (neither of which is shown) to be operated thereby.

One end of a connecting bar 27 is secured to and movable with the outer end of piston rod 25 in perpendicular relation thereto, the other end of said connecting bar having one end of a guide rod 28 secured in perpendicular relation thereto and parallel to piston rod 25. Guide rod 28 extends away from connecting bar 27 and slidably through a guide bore (not shown) of a support arm 29 rigidly secured to and depending from the underside of casing 4 of control valve device 1.

As shown specifically in FIG. 1, a generally cylindrical spring cage 30 of the force balancing device 2 provides connecting means to the connecting bar 27 by being perpendicularly secured thereto between the ends of the connecting bar so that said spring device is generally disposed between and axially parallel to control valve device 1 and power cylinder device 3. It should be obvious that movement of connecting bar 27 with piston 22 causes corresponding axial movement of spring cage 30. The opposite end of the spring device 2 is operatively connected through a linkage system to the piston 7 of the control valve device 1, said linkage system comprising a fulcrum member 31 disposed in axially parallel relation to piston 7 by having one end secured to the left end of casing 4 of valve device 1. The other end of fulcrum member 31 forms a pivotal connection 32 with one end of a connecting link 33, the other end of said connecting link forming a pivotal connection 34 with a clevis 35 of the caged spring device 2 for a purpose to be hereinafter disclosed. A piston rod 36 is concentrically secured at one end to the side of piston 7 opposite valve stem 11 and extends axially out of casing 4 with its opposite end forming a pivotal connection 37 with connecting link 33.

The caged spring or force balancing device 2, in addition to the spring cage 30, also comprises a coaxially disposed screw-threaded operating rod 38 having the clevis 35 secured to an outer end thereof. Operating rod 38 carries a tubular member having a screw-threaded nut 40 fixed on the end thereof adjacent clevis 35 for coaxially centering said rod within said tubular member and adjusting the axial positions relative to each other. The other end of operating rod 38 is coaxially centered in tubular member 39 by a centering nut 41 secured onto the corresponding adjacent end of said tubular member.

A spring retainer 42 is coaxially slidably supported on the rod 38 and tube 39 assembly adjacent an open end of spring cage 30 opposite the end fixed to connecting bar 27, and is provided with a plurality of ball bearings 43 to keep friction to a minimum during relative axial movement between the spring retainer and the rod and tube assembly. A spring 44 has one end anchored to spring retainer 42 and the other end anchored to a spring retainer 45 axially spaced apart from said spring retainer 42 and coaxially disposed inwardly of spring cage 30 toward the closed end fixed to connecting bar 27. The annular open end of spring cage 30 is normally in abutting, but separable, relation with the adjacent one of a pair of jam nuts 46 and 47 circumferentially carried by spring retainer 42. Spring retainer 45 has formed thereon an annular flange 48 for normally making abutting contact with a snap ring 49 fixed internally of and between the ends of spring cage 30. Abutting contact of flange 48 with snap ring 49 is made with the side of said snap ring opposite spring 44, so that said retainer, in a manner to be hereinafter disclosed, may be moved axially out of contact with said snap ring in a direction toward the closed end of spring cage 30. A tapered guide member 50 is coaxially fixed on the inner end of operating rod 38 and is adapted for engaging and disengaging a complementarily contoured recess 51 formed concentrically in the adjacent side of spring retainer 45.

Prior to placing the servo positioner apparatus into operation, operating rod 38 and jam nuts 46 and 47 are positionally adjusted relative to tubular member 39 and spring retainer 42, respectively, such that, when the several components of the servo positioner, that is, spool valve 10 and piston 7 of the control valve device 1, and piston 22 of the power cylinder device 3 are all in their respective neutral positions, in which they are shown in FIG. 1 of the drawings, guide member 50 should be resting in recess 51 without exerting any pressure against spring retainer 45, flange 48 of spring retainer 45 should be resting against snap ring 45 without exerting any pressure thereon, and the axial distance between spring retainers 42 and 45 should be such that spring 6 is subjected neither to compression or tension, but is in a totally relaxed state.

In operation of the embodiment of the invention shown in FIG. 1, it will be assumed that fluid pressure prevails at supply port 16 of the control valve device 1. If movement of piston rod 25 of the power cylinder device 3 is desired, the operator, through control apparatus not shown, causes a control pressure of a selected degree to be supplied to control port 9 for pressurizing the right side of actuator piston 7, thereby causing leftward movement of piston 7, piston rod 36, and spool valve 10. Leftward movement of piston rod 36 causes clockwise rotation of connecting link 33 about pivotal connection 32 and, consequently, corresponding leftward movement of clevis 35 and operating rod 38 of the caged spring device 2. Since centering nut 41 at the onset of such leftward movement is in abutting contact with the adjacent end of spring retainer 42, said spring retainer is also moved leftwardly along with rod 39 and away from spring cage 30 to the position indicated in broken outline in the drawing. Spring 44 is thus placed under a corresponding degree of tension and causes spring retainer 45 to exert a corresponding force on snap ring 49. Spring cage 30, connecting bar 27, piston rod 25, and piston 22, however, all remain in their respective neutral positions, as shown, because said piston 22 offers sufficient frictional resistance to the force exerted on snap ring 49 by flange 48 of spring retainer 45 so as not to be moved thereby.

As was above noted, spool valve 10 was moved leftwardly out of its neutral position to an initial supply position in which supply port 16 is communicated with delivery port 17, while delivery port 18 is communicated with exhaust port 20. The right side of piston 22 of power cylinder device 3 is thus vented to atmosphere via conduit 23, delivery port 18 and exhaust port 20, while the left side of said piston is pressurized by fluid pressure supplied via delivery port 17 and conduit 21.

With pressurization of the left side of piston 22, said piston and, therefore, piston rod 25 are moved to the right to an extended or operating position for effecting the desired operation or movement of the device or machine part (neither of which is shown) connected to stud 26, the amount of movement of said piston and piston rod being commensurate with the degree of the fluid pressure control impulse initiated by the operator and the resulting degree of fluid pressure supplied to the left side of said piston. Rightward movement of piston rod 25 causes similar movement of connecting bar 27 and spring cage 30 which, acting through snap ring 49, moves spring retainer 45 to the right also, thus placing spring 44 under further tension.

The rightwardly directed force exerted on spring 44 by spring retainer 45, as above described, counteracts the aforementioned leftwardly directed force exerted on said spring by spring retainer 42 until said leftwardly directed force is balanced, whereupon spring retainer 42, operating rod 38, connecting link 33, piston 7, and spool valve 10 are returned to their respective neutral positions. Spool valve 10 in its neutral or lapped position cuts off further supply of pressurized fluid to the left side of piston 22 of the power cylinder device 3, so that said piston and therefore piston rod 25 are retained in the extended position to which they have been operated until a change in the control impulse pressure is effected by the operator.

With piston 22 and piston rod 25 in their extended positions, spring 44 is also retained under a corresponding degree of tension which provides the feedback force for counterbalancing the effect of control fluid pressure acting on the right side of piston 7 of the actuator portion 5 of valve device 1. With all forces balanced, the servo positioner remains in the established position unless the operator effects a change, either increase or decrease, in the degree of control pressure acting on actuator piston 7, either on one side or the other thereof.

It should be apparent that an increase in control fluid pressure acting on the right side of actuator piston 7 effects, in the manner above described, further rightwardly extension of piston rod 25 of the power cylinder device 3 to a new position. On the other hand, if control pressure acting on the right side of actuator piston 7 is decreased, the prevailing tensional force of spring 44 becomes effective for drawing spring retainer 42 and operating rod 38 to the right to cause counterclockwise rotation of connecting link 33 and, therefore, rightward movement of spool valve 10 to a second supply position in which the left side of power piston 22 is vented to atmosphere via port 19, and the right side of said power piston is subjected to operating fluid pressure via supply port 16 and delivery port 18 until all forces are again balanced.

Moreover, if control pressure acting on the right side of actuator piston 7 is exhausted completely, pressure acting on the left side of power piston 22 continues to reduce and pressure on the right side of said power piston continues to build up until a state of equilibrium is reached in which said power piston and piston rod 25 are restored to the neutral or zero positions in which they are shown in the drawing.

If it is desired to position piston rod 25 out of its neutral position to a position to the left of neutral, the operator pressurizes the left side of actuator piston 7 which causes rightward movement of spool valve 10 and consequent venting of the left side of power piston 22 via vent port 19 while causing buildup of pressure acting on the right side of said power piston via delivery port 18 now communicating with supply port 16. When actuator piston 7 moves to the right, piston rod 36 also moves to the right which effects counterclockwise movement of connecting link 33 and consequent rightward movement of operating rod 38. In this instance, jam nut 47, by abutting against spring cage 30, prevents rightward movement of spring retainer 42, but guide member 50 acting against spring retainer 45, which is free to move to the right away from snap ring 48, causes rightward movement of spring retainer 45 and thereby places spring 44 under tension.

When power piston 22, piston rod 25, and connecting bar 27 are moved leftwardly, as viewed in the drawing, spring cage 30 acting through jam nut 47 causes corresponding leftward movement of spring retainer 42 to place spring 44 under additional tension until such tension is sufficient for balancing the effective force of control pressure acting on the left side of actuator piston 7 and exerted through piston rod 36, connecting link 33 and operating rod 39. When the opposing forces are thus balanced, actuator piston 7 and spool valve 10 of control valve device 1 are restored to their neutral positions, and the position of power piston rod 25 is established.

Variations of control pressure acting on the left side of actuator piston 7 are effective for causing corresponding changes in the position of power piston 22 and piston rod 25 in a manner similar to that discussed above in connection with pressurization of the right side of actuator piston 7.

The servo positioner shown in FIG. 2 is arranged such that the neutral or zero position of the power piston 22 of power cylinder device 3 is at one end of the travel stroke, in this instance at the left end, as viewed in the drawing. In addition to the control valve device 1 and the power cylinder device 3, the servo positioner shown in FIG. 2 also comprises a caged spring or force balancing device 52 somewhat different from the caged spring device 2 of FIG. 1.

Since control valve device 1 and power cylinder device 3 are identical in structure to those shown in FIG. 1, identical reference numerals to those in FIG. 1 have been assigned to the corresponding components of said control valve device and power cylinder device shown in FIG. 2.

Spring device 52, which is operatively interposed between control valve device 1 and power cylinder device 3 in substantially axially parallel relation thereto, comprises a spring retainer 53 having a clevis 54 formed thereon, said clevis being pivotally connected to the end of connecting link 33 opposite pivotal connection 32. A screw-threaded support rod 55 has one end adjustably secured to connecting bar 27 and extends perpendicularly away therefrom toward and in axial alignment with clevis 54. The opposite end of support rod 55 has a spring retainer 56 coaxially secured thereto in oppositely facing relation to spring retainer 53. Spring retainers 53 and 56 are axially spaced apart with opposite ends of a spring 57 anchored thereto, respectively. The one end of support rod 55 is positionally adjusted at connecting bar 27 so that the length of said support rod between said connecting bar and spring retainer 56 is such to maintain spring 57 free of either compression or tension, that is, in a relaxed state, when the several components of the servo positioner are in their respective neutral positions in which they are shown in FIG. 2 of the drawings.

Since the operation of the servo positioner apparatus shown in FIG. 2 entails pressurization and depressurization of the left side only of power piston 22, control port 8 is not connected to control pressure but may be kept vented to atmosphere.

In order to effect movement of piston rod 25 and, therefore, of the machine part or device (neither of which is shown) connected to stud 26, the operator effects supply of a control pressure impulse of a selected degree to the right side of actuator piston 7. The control valve device 1 functions in the manner above described in connection with the apparatus shown in FIG. 1 for effecting supply of operating fluid pressure to the left side of power piston 22 to cause said piston, piston rod 25, and stud 26 to be moved to the right to an operating position in which the machine part or device connected thereto is operated to a desired position. In similar manner as the apparatus shown in FIG. 1, control pressure acting on the right side of actuator piston 7 causes clockwise movement of connecting link 33, which, acting through clevis 54 and spring retainer 53, exerts a corresponding leftwardly directed tensional force on spring 57. At the same time, rightward movement of piston rod 25 and, therefore, of connecting bar 27 and support rod 55 exerts a rightwardly directed tensional force on spring 57 which brings about a balancing of the forces and consequent restoration of actuator piston 7 and spool valve 10 to their neutral positions, with piston rod 25 and stud 26 remaining in their established operating positions.

It should be evident that an increase in control pressure acting on actuator piston 7 causes, as above described, further rightward movement of power piston 22, piston rod 25 and stud 26 to a new operating position. A reduction, either partial or total, of control pressure acting on actuator piston 7 renders the rightwardly directed tensional force of spring 57 effective for causing counterclockwise movement of connecting link 33 and consequent rightward movement of spool valve 10, which, as noted in connection with the apparatus of FIG. 1, opens the left side of power piston 7 to atmosphere via port 19 and admits pressure to the right side of said power piston. Power piston 22, along with piston rod 25 and stud 26, are thus moved leftwardly until all the forces of the apparatus attain a state of equilibrium again. Depending upon the degree of reduction of control pressure acting on actuator piston 7, power piston 22 assumes either a new position or the neutral position.

The pressurized operating fluid supplied to the power cylinder device 3 for operation thereof may be either pneumatic of hydraulic.

Having now described the invention, what we claim as new and desire to secure by Letters Patent, is:

1. Servo positioner apparatus for selectively positioning a mechanical member in a desired position and maintaining the mechanical member in said desired position until a change is effected, said servo positioner apparatus comprising:

a. power piston means connectable to the mechanical member and normally occupying a neutral position, said power piston means being movable out of said neutral position to a different position in response to operating fluid pressure;

b. control valve means comprising:

i. a valve member having a cut-off position in which a supply communication via which operating fluid pressure may be supplied to said power piston means is closed and being operable to a supply position in which said supply communication is open, and ii. an axially movable actuator member connected to said valve member and effective, when subjected to a variable control fluid pressure impulse, for operating said valve member to its said supply position; and c. force balancing means comprising:

i. a spring normally disposed in a relaxed state, ii. an operating rod axially aligned with and having one end connected to one end of said spring, iii. a connecting link having one end pivotally connected to said other end of said operating rod and the other end pivotally fulcrumed on said control valve means, iv. an actuator rod axially aligned with and having one end connected to said actuator member and the other end pivotally connected to said connecting link between the ends thereof for effecting rotational movement of the connecting link about its fulcrumed end and consequent axial movement of said operating rod in one direction, said axial movement of said operating rod being effective for subjecting said spring to a first tensional force acting in said one direction according to movement of said actuator member, v. connecting means axially aligned with and having one end connected to the other end of said spring, vi. a connecting bar rigidly connecting one end of the power piston means to the other end of said connecting means for effecting axial movement thereof concurrently with and to a corresponding amount as that of said power piston means in a direction opposite to the axial movement of said operating rod for subjecting said spring to a second tensional force acting in a direction opposite to that of said first tensional force, vii. said spring being cooperative with said operating rod, said connecting link, and said actuator rod member, upon attainment of a balanced state between the oppositely directed tensional forces for effecting restoration of said valve member to its said cut-off position.

2. Servo positioner apparatus, as set forth in claim 1, wherein said force balancing means further comprises two-way means for causing said spring to be subjected to said oppositely directed tensional forces by opposed axial movement of said operating rod and said connecting means in both directions, respectively.

3. Servo positioner apparatus, as set forth in claim 2, wherein said two-way means comprises:
   a. a first spring retainer coaxially and operatively interposed between said operating rod and said connecting means with said one end of said spring anchored thereto,
   b. a second spring retainer coaxially and operatively interposed between said operating rod and said connecting means with said other end of said spring anchored thereto and in axially spaced apart relation with said first spring retainer,
   c. said operating rod, when moving axially in a first direction, being engageable with said first spring retainer and disengageable from said second spring retainer for effecting concurrent and corresponding axial movement of said first spring retainer only, and being engageable with said second spring retainer and disengageable from said first spring retainer, when moving axially in a second direction opposite to said first direction, for effecting concurrent and corresponding axial movement of said second spring retainer only, and
   d. said connecting means being engageable with said second spring retainer and disengageable from said first spring retainer, when moving axially in a first direction oppositely to and concurrently with axial movement of said operating rod in its said first direction, for effecting concurrent axial movement of said second spring retainer in a direction corresponding to that of the connecting means, and being engageable with said first spring retainer and disengageable from said second spring retainer, when moving axially in a second direction oppositely to and concurrently with axial movement of said operating rod in its second direction, for effecting concurrent axial movement of said first spring retainer in a direction corresponding to that of the connecting means.

4. Servo positioner apparatus, as set forth in claim 3, wherein said first spring retainer is provided with a coaxial bore through which said operating rod extends for abuttingly engaging said second spring retainer during movement of said operating rod in its said second direction, said coaxial bore having ball bearing means disposed therein for providing friction free relative axial movement between the operating rod and the first spring retainer.

* * * * *